US012037499B2

(12) United States Patent
Sahu et al.

(10) Patent No.: US 12,037,499 B2
(45) Date of Patent: Jul. 16, 2024

(54) PROCESSABLE POLYMER, METHOD, AND APPARATUS FOR ADDITIVE MANUFACTURE

(71) Applicant: The Boeing Company, Chicago, IL (US)

(72) Inventors: Megha Sahu, Bengaluru (IN); Om Prakash, Bengaluru (IN)

(73) Assignee: The Boeing Company, Arlington, VA (US)

( * ) Notice: Subject to any disclaimer, the term of this patent is extended or adjusted under 35 U.S.C. 154(b) by 856 days.

(21) Appl. No.: 16/710,978

(22) Filed: Dec. 11, 2019

(65) Prior Publication Data

US 2021/0179869 A1 Jun. 17, 2021

(51) Int. Cl.
| | |
|---|---|
| *C09D 11/102* | (2014.01) |
| *B29C 64/118* | (2017.01) |
| *B29C 64/209* | (2017.01) |
| *B33Y 10/00* | (2015.01) |
| *B33Y 30/00* | (2015.01) |
| *B33Y 70/10* | (2020.01) |
| *B33Y 80/00* | (2015.01) |
| *C08K 5/09* | (2006.01) |
| *C08K 5/134* | (2006.01) |
| *C08K 7/02* | (2006.01) |
| *C09D 171/00* | (2006.01) |
| *B29K 71/00* | (2006.01) |
| *B29K 105/16* | (2006.01) |

(52) U.S. Cl.
CPC .......... *C09D 11/102* (2013.01); *B29C 64/118* (2017.08); *B29C 64/209* (2017.08); *B33Y 10/00* (2014.12); *B33Y 30/00* (2014.12); *B33Y 70/10* (2020.01); *B33Y 80/00* (2014.12); *C08K 5/09* (2013.01); *C08K 5/1345* (2013.01); *C08K 7/02* (2013.01); *C09D 171/00* (2013.01); *B29K 2071/00* (2013.01); *B29K 2105/167* (2013.01)

(58) Field of Classification Search
CPC ........ C08K 11/00; C08K 5/09; C08K 5/1345; C08K 7/02; B29C 64/10; B29C 2071/00; B29C 2105/167; C09D 11/102; C09D 171/00; B33Y 80/00; B33Y 70/10
See application file for complete search history.

(56) References Cited

U.S. PATENT DOCUMENTS

| | | | |
|---|---|---|---|
| 3,871,904 A * | 3/1975 | Haas | ...................... C09K 19/56 427/164 |
| 6,093,777 A | 7/2000 | Sorensen et al. | |
| 6,497,959 B1 | 12/2002 | Mhetar | |
| 6,809,159 B2 | 10/2004 | Adedeji | |
| 6,934,600 B2 | 8/2005 | Jang et al. | |
| 8,206,827 B2 | 6/2012 | Choate | |
| 10,137,617 B2 | 11/2018 | Kunc et al. | |
| 10,682,844 B2 * | 6/2020 | Mark | ................... B29C 45/1418 |
| 11,491,739 B2 * | 11/2022 | Susnjara | ............... B29C 64/165 |
| 2004/0192857 A1 | 9/2004 | Borer et al. | |
| 2007/0260015 A1 | 11/2007 | Stork et al. | |
| 2008/0139712 A1 | 6/2008 | Scherzer et al. | |
| 2012/0181487 A1 | 7/2012 | Gibon et al. | |
| 2013/0337256 A1 * | 12/2013 | Farmer | .................. B33Y 70/00 428/371 |
| 2015/0375457 A1 * | 12/2015 | Mark | ...................... B33Y 10/00 425/166 |
| 2016/0257070 A1 * | 9/2016 | Boydston | ............... B29C 64/165 |
| 2018/0087189 A1 | 3/2018 | Wetzel et al. | |
| 2018/0215917 A1 | 8/2018 | Naruse | |
| 2022/0063185 A1 * | 3/2022 | Isaki | ................... B29C 65/1654 |

FOREIGN PATENT DOCUMENTS

| | | | | |
|---|---|---|---|---|
| CN | 102337018 A | | 2/2012 | |
| CN | 110193894 A | | 9/2019 | |
| EP | 2781342 A1 * | | 9/2014 | ............. B29C 67/00 |
| EP | 3231589 A1 * | | 10/2017 | ............. B29C 67/00 |
| EP | 3674061 A1 | | 7/2020 | |
| GB | 2526328 A | | 11/2015 | |
| KR | 20180058946 A | | 6/2018 | |

OTHER PUBLICATIONS

European Patent Office, Extended European Search Report Issued in Application No. 20208929.8, Aug. 2, 2021, Germany, 16 pages.
European Patent Office, Partial European Search Report Issued in Application No. 20208929.8, Apr. 29, 2021, Germany, 12 pages.
Samitsu, S et al., "Self-Assembly and One-Dimsentional Alignment of a Conducting Polymer Nanofiber in a Nematic Liquid Crystal," Macromolecules, Jun. 9, 2009, 3 pages.
Samitsu, S et al., "Self-Assembly and One-Dimsentional Alignment of a Conducting Polymer Nanofiber in a Nematic Liquid Crystal," Supporting Information For Publication, 4 pages.
European Patent Office, Office action issued in European Application No. 20208929.8, Mar. 1, 2023, Netherlands, 4 pages.

* cited by examiner

*Primary Examiner* — Jane L Stanley

(74) *Attorney, Agent, or Firm* — Alleman Hall & Tuttle LLP

(57) ABSTRACT

A process for additive manufacture of an article comprises conveying a material through a heated nozzle to form a flowing mass of the material. The material comprises a polymer matrix including a plurality of polymeric chains and an alignment additive dispersible within the polymer matrix. The alignment additive is configured to align the plurality of polymeric chains in a flow direction of the flowing mass of the material. The process further comprises aligning at least a portion of the polymeric chains, via the alignment additive, along a direction of flow through the heated nozzle, releasing the flowing mass of the material from the heated nozzle, and allowing the material to solidify.

24 Claims, 8 Drawing Sheets

4-(heptyloxy)benzoic acid 4-(octyloxy)benzoic acid 4-(decyloxy)benzoic acid 4,4'-azoxyanisole 4-isothiocyanatophenyl-4-pentylbicyclo[2.2.2]octane-1-carboxylate 4-methoxycinnamic acid

PROCESSABLE POLYMER, METHOD, AND APPARATUS FOR ADDITIVE MANUFACTURE

TECHNICAL FIELD

This disclosure relates generally to the field of polymer engineering and, more particularly, to polymer materials having improved processability and the use of such materials in additive manufacturing.

BACKGROUND

Additive manufacture, or '3D printing' can been used to make articles of almost arbitrary shape and size. In additive manufacture, a solid, real-world article is built up, layer-by-layer, based on a digital model that defines the topology of the article. The result is a high-fidelity realization of the digital model, obtained without dedicated tooling and with minimal human intervention. In variants in which a thermoplastic-polymer article is desired, a thermoplastic-polymer feedstock is conducted through a heated nozzle positioned at a locus of the article where material is to be deposited. The position of the locus is controlled in real time by moving the article with respect to the nozzle and/or rastering the nozzle over the article. Upon exiting the nozzle, the thermoplastic-polymer material cools and adheres to the underlying layer of the article.

A wide range of thermoplastic-polymer materials have been used in additive manufacture, but some materials present particular challenges. One challenge relates to the additive manufacture of articles comprising high molecular-weight polymers that exhibit desirable mechanical properties, thermal stability, and/or chemical resistance. Similar challenges occur with polymers having functional groups that impart rheologically significant steric bulk.

SUMMARY

In view of the context above, some of the examples disclosed herein relate to an additively manufactured article comprising a polymer matrix and an alignment additive. The polymer matrix includes a plurality of aligned polymeric chains. Dispersed within the polymer matrix, the alignment additive includes one or more of a liquid-crystal molecule, a hyperbranched macromolecule, a nanotube, and a nanowire.

Other examples relate to a material adapted as a feedstock for additive manufacture. The material comprises a polymer matrix and an alignment additive. The polymer matrix includes a plurality of polymeric chains and is configured to form a flowable mass at an elevated temperature. The alignment additive is dispersible within the polymer matrix and configured to align the plurality of polymeric chains in a direction of flow through a conduit of an additive-manufacture apparatus.

Other examples relate to a process for additive manufacture of an article. The process comprises conveying a material through a heated nozzle to form a flowing mass of the material. The material comprises a polymer matrix including a plurality of polymeric chains and an alignment additive dispersible within the polymer matrix. The alignment additive is configured to align the plurality of polymeric chains in a flow direction of the flowing mass of the material. The process further comprises aligning at least a portion of the polymeric chains, via the alignment additive, along a direction of flow through the heated nozzle, releasing the flowing mass of the material from the heated nozzle, and allowing the material to solidify.

Still other examples relate to an apparatus for additive manufacture of an article from a material comprising a polymer matrix having a plurality of polymeric chains and an alignment additive. The apparatus comprises a nozzle, an elongate conduit, one or more heaters, and a material conveyor configured to convey the material through the elongate conduit and nozzle. Coupled fluidically to the nozzle, the elongate conduit is of sufficient length to achieve alignment of the plurality of the polymeric chains, via the alignment additive, when the material flows through the conduit at elevated temperature. The one or more heaters are configured to heat the elongate conduit and the nozzle to allow the material to flow within the conduit and through the nozzle.

This Summary is not intended to identify key features or essential features of the claimed subject matter. Indeed, the scope of the claimed subject matter is limited neither to the content of this Summary nor to implementations that address any problems or disadvantages noted in any part of this disclosure. The features, functions, and advantages described in this disclosure may be achieved independently in some implementations and may be combined in other implementations.

BRIEF DESCRIPTION OF THE DRAWINGS

This disclosure will be better understood from reading the following Detailed Description with reference to the attached drawing figures, wherein.

DETAILED DESCRIPTION

Figure 1:
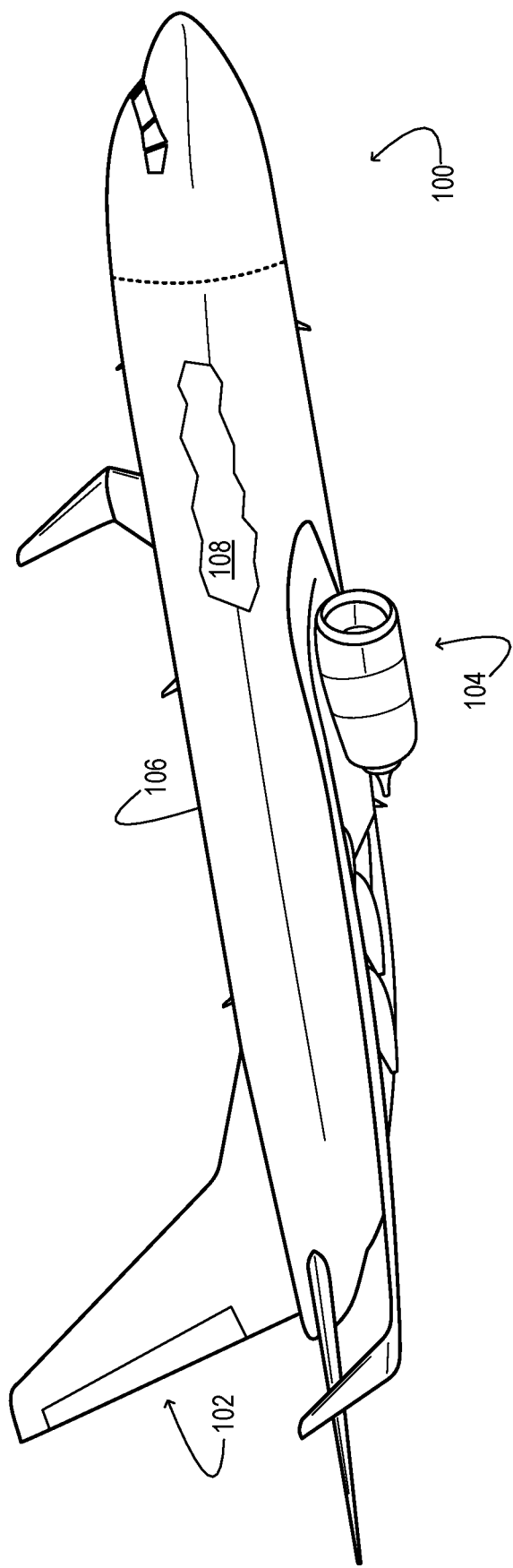
FIG. 1 shows aspects of an example manufactured product that may include an additively manufactured polymer article.

Additive manufacture of articles comprising thermoplastic polymers can be problematic due to the limited flowability of the polymer feedstock. Generally speaking, the polymer chains of many commonly available, high molecular-weight polymers are randomly oriented and significantly entangled. These features reduce the flowability of such polymers at all temperatures. Steric bulk in polymer side-chains may also reduce flowability, even in relatively lower molecular-weight polymers. Due to the decreased flowability, undesirably high temperature and/or pressure may be required in order to conduct a thermoplastic polymer through the nozzle of an additive-manufacture apparatus.

Such conditions may increase manufacturing costs and, in scenarios in which very high temperatures are employed, may limit the range of usable polymers and/or degrade the desirable material properties of the polymers, such as optical transparency.

The inventors herein have recognized the above issues and have discovered several related innovations that may improve the processability of thermoplastic polymers in additive manufacturing. The disclosed examples utilize the incorporation of an alignment additive into the polymer matrix of the thermoplastic-polymer feedstock provided to an additive-manufacture apparatus. The alignment additive is a molecular or macromolecular species configured to induce alignment of the polymeric chains in the flowing polymer. In some examples, alignment parallel to the flow direction is achieved. In the aligned state, the polymeric chains are more flowable than in the randomly oriented, entangled state. Accordingly, a polymer matrix comprising the alignment additive can provide a suitable feedstock for additive manufacture of thermoplastic articles.

Alignment additives of various kinds may be incorporated into the polymer matrix of the feedstock. Example alignment additives include liquid-crystal molecules, nanotubes, and/or nanowires having a high aspect ratio. These species align naturally in the flow direction of the polymer under fluid-dynamic forces and induce alignment of neighboring polymeric chains via intermolecular forces. Alternatively, or in addition, an alignment additive may include a hyperbranched macromolecule, such as a dendrimer. Hyperbranched macromolecules may reduce the viscosity of a flowing high molecular-weight polymer and thereby accelerate the alignment of the polymeric chains due to shear forces.

This disclosure is presented by way of example and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see. As used herein, the phrase 'one or more of' prepends an inclusive enumeration of options. Accordingly, a phrase of the form, 'one or more of A and B' equates to 'one or more members of' the set {A, B}. That phrase neither excludes nor requires one or more instances of A concurrent with one or more instances of B.

Before describing in detail, the additive manufacture of a thermoplastic article, an example application context for such an article will be presented. FIG. 1 shows aspects of an example manufactured product in the form of an aircraft 100. The aircraft includes, inter alia, an aerostructure 102, power plant 104, skin 106, and cabin interior 108.

Virtually all of the structural and/or functional components of aircraft 100 may be optimized for mechanical strength. In addition, many of the same components, among others, may be optimized for reduced weight. As such, various airframe components are constructed from high-strength metals, such as steel and titanium, whereas other components may be constructed from so-called 'performance polymers', a term that includes selected high molecular-weight, thermoplastic polymer materials.

Figure 2A:
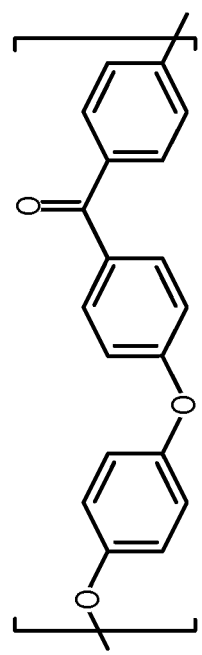
FIGS. 2A and 2B show molecular structures of example polymers adaptable to additive manufacture as disclosed herein.

One non-limiting example of a high molecular-weight, thermoplastic polymer material with applicability to aircraft manufacture is polyether ether ketone (PEEK). The chemical structure of PEEK is shown in FIG. 2A. PEEK has a melting temperature ($T_m$) of 341° C. and a glass-transition temperature ($T_g$) of 143° C. In some examples, the molecular weight of a high molecular-weight polymer can be 10,000 Daltons or greater.

PEEK is a semi-crystalline thermoplastic exhibiting high thermal resistance, chemical resistance, and wear resistance, in addition to fatigue and creep resistance. PEEK exhibits exceptional tensile properties, which are retained even at elevated temperatures. Accordingly, the service temperature range of a PEEK article may extend to 260° C. Above the service temperature range, the material remains virtually non-flammable and emits very little smoke or gas when burned. PEEK articles can be further strengthened via fiber reinforcement. When reinforced with carbon fiber, for example, a tensile strength of 29,000 psi ($lbf/in^2$) can be achieved. Additional properties of filled and unfilled PEEK materials are summarized in Table 1.

TABLE 1

Selected properties of high molecular-weight PEEK polymer.

| Property | unfilled | 30% carbon fiber | 30% glass fiber |
| --- | --- | --- | --- |
| dielectric constant | 3.2 | 3.2-3.4 | 3.3-4.2 |
| dielectric strength (kV/mm) | 20 | 18.5-19 | 15-24 |
| volume resistivity/$10^{15}$ ohm cm | 16-17 | 1-8 | 15-16 |
| elongation % at break | 30-150 | 1-3 | 2-3 |
| flexibility (flexural modulus)/GPa | 3.7-4 | 13-19 | 9-10 |
| Young modulus/GPa | 3.5-3.9 | 13-22.3 | 9-11.4 |
| toughness (notched Izod impact at room temperature)/J $m^{-1}$ | 80-94 | 85-120 | 95-130 |
| density/g $cm^{-3}$ | 1.26-1.32 | 1.4-1.44 | 1.49-1.54 |
| thermal insulation (thermal conductivity)/W $m^{-1}K^{-1}$ | 0.25 | 0.9-0.95 | 0.43 |

Figure 2B:
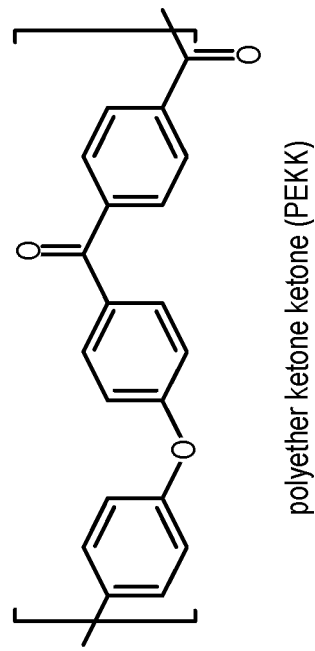

Returning to FIG. 1, polymer articles comprising PEEK and/or other suitable thermoplastics may be incorporated into various portions of aircraft 100, to exploit desirable material properties as noted above. In aerostructure 102, for example, thermoplastic-polymer articles may be used for bearings and bushings, and as reinforcement for composite panels including hard points, thermal isolators, and fasteners. In power plant 104, heat- and chemical-resistant thermoplastic-polymer articles may be used in fuel systems, turbines, and nacelles, and for dry and lubricated material contacts. In skin 106, ultraviolet (UV)-stable and moisture-resistant thermoplastic-polymer articles may provide superior resistance to weathering. Low-flammability thermoplastic polymer articles may also be used in cabin interior 108 and in conduits to protect wires and fiber optic filaments. To form such components, a thermoplastic polymer such as PEEK may be processed conventionally via injection molding, extrusion molding, and compression molding. However, the use of some thermoplastics, such as PEEK, in state-of-the-art additive manufacture is problematic for the reasons discussed hereinabove. The same limitations and many of the same benefits may exist for various other thermoplastics, such as polyether ketone ketone (PEKK), having the structure shown in FIG. 2B, and various nylon compounds, such as nylon-12 (poly(dodecano-12-lactam)).

It will be understood that the examples illustrated in this disclosure in no way limit the applicability of the underlying methodologies. Indeed, the processes described herein can be applied to the additive manufacture of a wide range of articles. Such articles may or may not be specifically configured to optimize mechanical strength relative to weight, or to provide heat, chemical, or weather resistance, or fire safety.

Figure 3A:
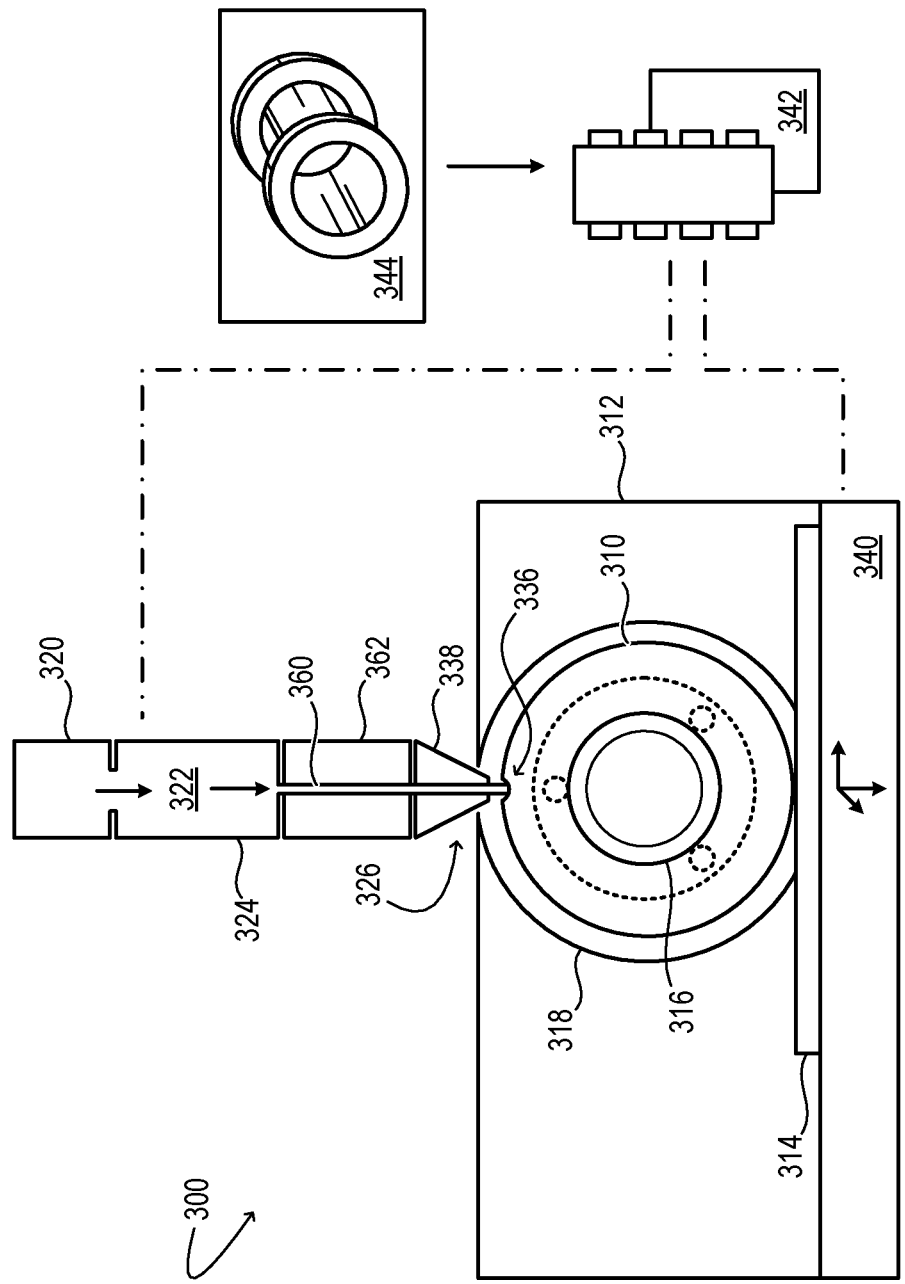
FIG. 3A shows aspects of an example apparatus configured for additive manufacture of a polymer article.

FIG. 3A shows aspects of an example apparatus 300 configured for additive manufacture of a thermoplastic-polymer article 310. Apparatus 300 includes a chamber 312 that supports the article during the additive-manufacture process. The chamber includes a platen 314 to which the article is secured during the additive-manufacture process. In the particular example illustrated in FIG. 3A, substrate 316 of article 310 is secured to a rotating chuck 318, which is coupled mechanically to platen 314. A 'substrate', as used herein, is a base portion of the article to be formed via additive manufacture. In some examples, the substrate is a portion of relatively simple topology, which can be formed by conventional processing. Rotating chuck 318 can be used for the additive manufacture of articles having rotational symmetry, such as a bushing. In other examples, a vice or clamp can be used in lieu of the chuck to secure the substrate or any other portion of the article to the platen.

In apparatus 300, article 310 is formed in layers by spatially selective addition of thermoplastic-polymer material to the underlying layer of the article, starting with substrate 316. Accordingly, apparatus 300 includes a material reservoir 320 configured to store a supply of thermoplastic-polymer material 322. The thermoplastic-polymer material can comprise a filament, pellets of any dimension, granules, or a coarse or fine powder, for example.

Apparatus 300 includes a material conveyor 324 configured to convey thermoplastic-polymer material 322 from material reservoir 320 and to deliver the thermoplastic-polymer material to nozzle 326. The nozzle comprises an aperture in the conduit through which the thermoplastic-polymer material is conducted. In some implementations, the nozzle aperture is normal to the direction of flow through the conduit and cuts across the full diameter of the conduit, while in other implementations the nozzle aperture may have any other suitable configuration. The nozzle-aperture diameter can be about one millimeter in some examples. In other examples, the nozzle-aperture diameter can be about five millimeters, or larger. In some implementations, the material conveyor can be configured to forcibly conduct thermoplastic-polymer material 322 through nozzle 326.

Figure 3C:
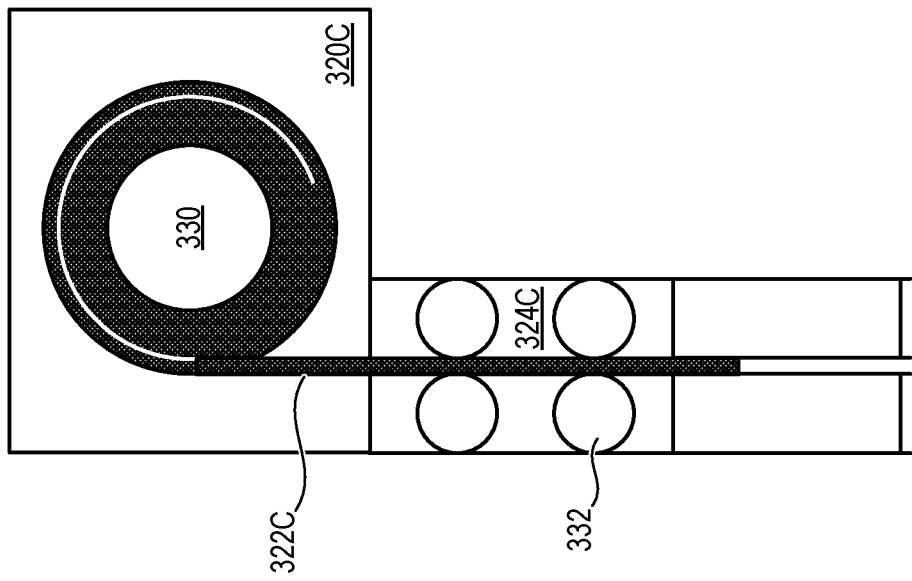
FIGS. 3B and 3C show aspects of example material reservoirs and material conveyors of the apparatus of FIG. 3A.
Figure 3B:
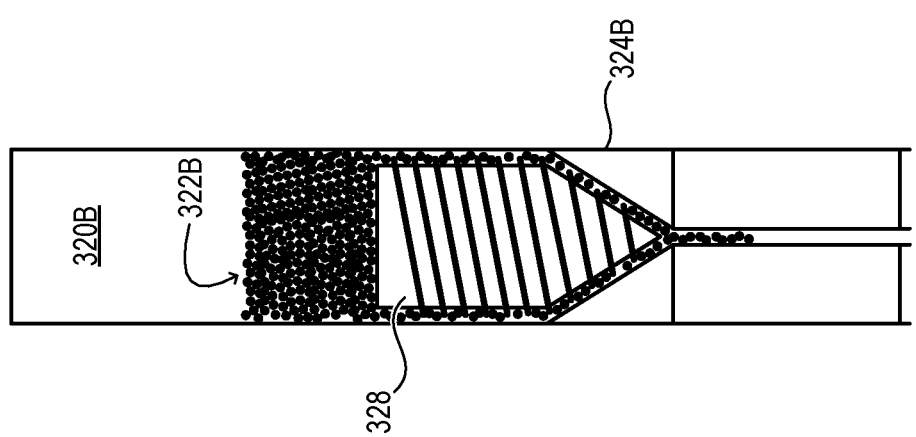

FIG. 3B shows aspects of an example material reservoir 320B and material conveyor 324B suitable for storing and conveying thermoplastic polymer material 322B in the form of pellets, granules, and/or powders. In this example, material conveyor 324B includes a screw feeder 328.

FIG. 3C shows aspects of another example material reservoir 320C and material conveyor 324C suitable for storing and conveying thermoplastic-polymer material 322C in the form of a filament. In this example, material reservoir 320C includes a spool 330 around which the filament is wound, and material conveyor 324C includes a filament feeder 332.

Returning now to FIG. 3A, nozzle 326 of apparatus 300 is arranged over locus 336 where thermoplastic-polymer material is to be added to article 310. Nozzle heater 338 is coupled thermally to nozzle 326. The nozzle heater is configured to heat the nozzle and thereby heat the thermoplastic-polymer material flowing through the nozzle to a desired setpoint temperature or range of temperatures. In some examples, nozzle heater 338 is a resistive heater powered electrically via a proportional-integral-derivative (PID)-based temperature controller, which is operatively coupled to a thermocouple or other form of temperature sensor. In this manner, the setpoint temperature of the flowing thermoplastic-polymer material is achieved via closed-loop control. In some examples, apparatus 300 may include additional heaters, as described hereinafter.

Apparatus 300 includes a translational stage 340 mechanically coupled to platen 314. As articles are formed layer-by-layer in apparatus 300, the translational stage can be configured to gradually lower the height of the platen as successive layers of the article are built up. The translational stage can also be configured to move the platen laterally to controllably vary the relative position of locus 336 relative to the frame of reference of the platen and, accordingly, of article 310. The translational stage can include two or more component translational stages (e.g., linear actuators) configured to move the platen in two or more corresponding directions, which may include Cartesian X, Y, and Z axes, for instance. In some examples, one or more component rotational stages are used in lieu of, or in addition to the one or more component translational stages. In other examples equally consonant with this disclosure, a translational or rotational stage is coupled mechanically to nozzle 326, and the platen may be stationary. In still other examples, the platen as well as the nozzle can be controllably actuated.

Apparatus 300 further includes a computer 342. Computer 342 is operatively coupled to translational stage 340 and configured to control in real time the relative position of locus 336 relative to the frame of reference of platen 314, via a series of actuator-control signals. In addition, the computer is operatively coupled to material conveyor 324 and configured to control in real time, via one or more material-conveyance control signals, the rate of flow of the thermoplastic-polymer material through nozzle 326. Computer 342 is further configured to receive a digital model 344 that represents the topology of the article to be formed. The nature and/or digital data structure of the digital model is not particularly limited. The digital model may include a CAD file in some examples. The computer is configured to vary the actuator- and material-conveyance control-signal outputs based on the digital model, so as to achieve additive manufacture of the article as defined by the digital model.

Figure 4:
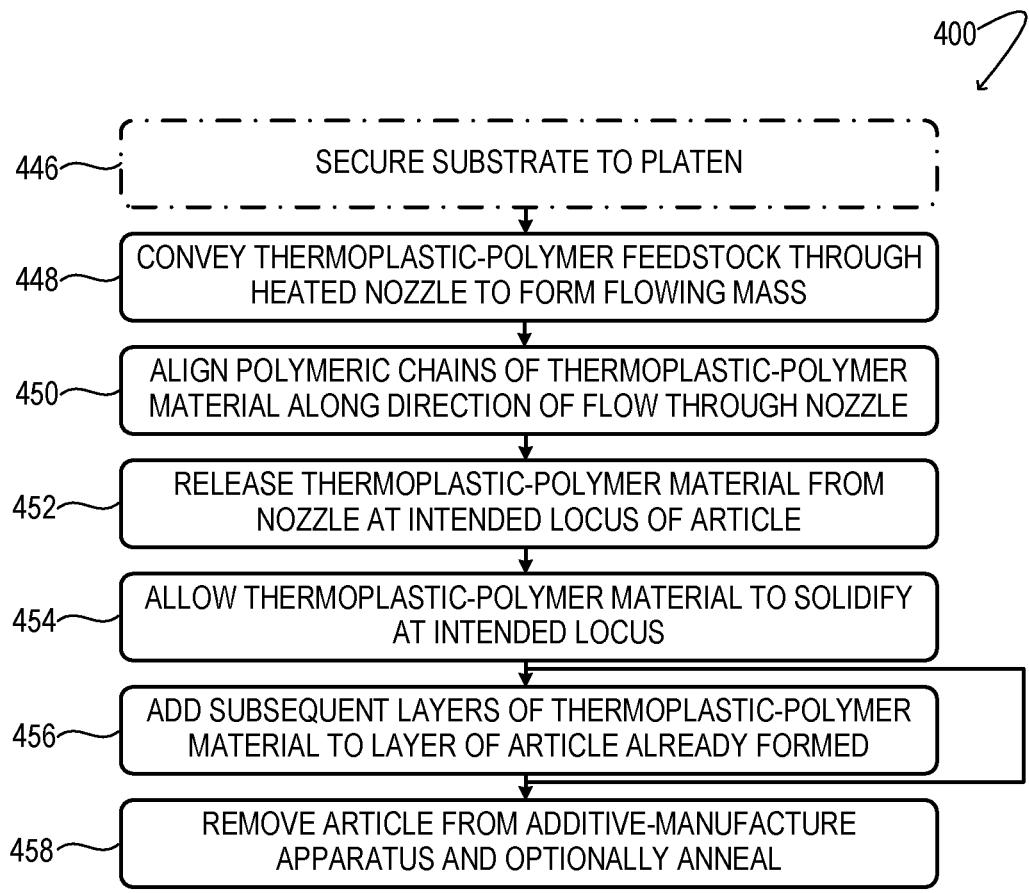
FIG. 4 illustrates aspects of an example process for additive manufacture of a polymer article.

FIG. 4 illustrates aspects of an example process 400 for additive manufacture of a thermoplastic-polymer article. Process 400 can be implemented using apparatus 300 of FIG. 3A, as described hereinabove. It will be understood, however, that process 400 may implemented using any other suitable apparatus, which, in some implementations, may differ significantly from apparatus 300.

At optional step 446 of process 400, a substrate of the article is secured to a platen of an additive-manufacture apparatus. The substrate can be secured via a vice, clamp, or chuck, for instance. In some examples, the substrate may comprise a thermoplastic polymer, although that aspect is not strictly necessary. More generally, the substrate may comprise any structure to which the thermoplastic feedstock material will adhere upon solidification. In some examples, the substrate is milled, lathed, or abrasively roughened, or chemically treated to promote adhesion of the thermoplastic feedstock material to be added.

At 448 of process 400, a thermoplastic-polymer material adapted as a feedstock for additive manufacture is conveyed through a heated nozzle to form a flowing mass. In examples in which the thermoplastic-polymer material takes the form of a filament or wire, the thermoplastic-polymer material is conveyed via a filament feeder. In some examples in which the thermoplastic-polymer material takes the form of a pellet, granule or powder, the thermoplastic-polymer material is conveyed via a screw feeder.

The thermoplastic-polymer material conveyed at 438 comprises a polymer matrix including a plurality of polymeric chains. The polymer matrix is configured, by virtue of its macromolecular structure, to form a flowable mass at an elevated temperature. Aspects of the macromolecular structure that provide this feature include, for instance, the backbone structure including heteroatoms (if any), pendent side-chains and functional groups (if any), and the extent of cross-linking (if any), which influence both $T_m$ and the viscosity at temperatures above $T_m$. In some examples, the polymer matrix comprises PEEK or PEKK. In some examples, the polymer matrix comprises a nylon polymer. In some examples, the polymer matrix comprises two or more different thermoplastic polymers. An example 'elevated temperature', as used herein, is any temperature in a range extending from the melting temperature $T_m$ of the polymer matrix to a temperature at which the polymer decomposes observably on the timescale of processing. In one particular example, an elevated temperature by include a temperature of 30° C. above $T_m$.

The thermoplastic-polymer material conveyed at 438 further comprises an alignment additive dispersible within the polymer matrix. In some examples, the alignment additive comprises between 0.01 and 25% by mass of the thermoplastic-polymer material. In more particular examples, the alignment additive comprises between 0.01 and 10% by mass of the thermoplastic-polymer material. The alignment additive is configured, by virtue of its molecular or macromolecular structure, to align the plurality of polymeric chains in a direction of flow through a conduit of the additive-manufacture apparatus. The alignment additive may increase the melt-flow index of the thermoplastic-polymer material beyond that of polymer matrix having no alignment additive. A particular alignment additive incorporated in a thermoplastic-polymer material can be chosen empirically in some examples, based on its ability to do so.

Figure 5A:
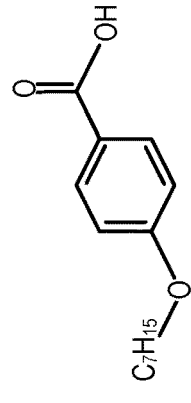
FIGS. 5A through 5F show molecular structures of example liquid-crystal materials usable as alignment additives in the method of FIG. 4.
Figure 5B:
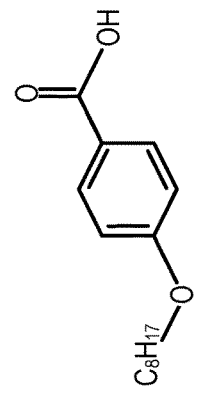
Figure 5C:
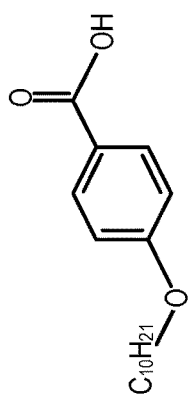
Figure 5D:
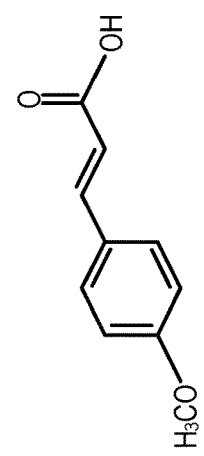
Figure 5E:
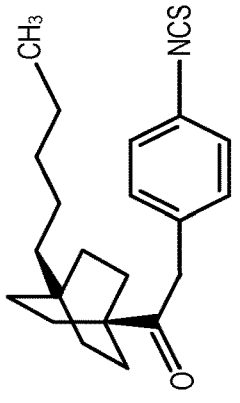
Figure 5F:
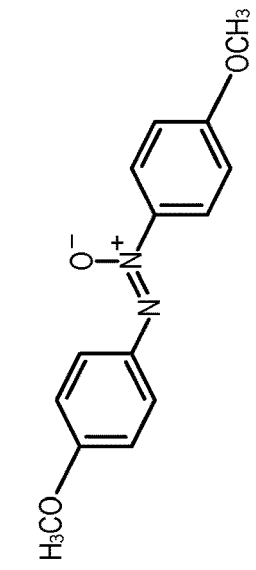

In some examples, the alignment additive comprises a liquid-crystal (LC) material comprising numerous liquid-crystal molecules. Both smectic and nematic liquid crystals may be used. Examples of smectic liquid-crystal materials suitable for use as an alignment additive include 4-(heptyloxy)benzoic acid, 4-(octyloxy)benzoic acid, and 4-(decyloxy)benzoic acid. Having the structure shown in FIG. 5A, 4-(heptyloxy)benzoic acid exhibits a melting point of 146° C. and a transition to the isotropic phase at 146° C. Having the structure shown in FIG. 5B, 4-(octyloxy)benzoic acid exhibits a melting point of 101 to 105° C. and a transition to the isotropic phase at 147° C. Having the structure shown in FIG. 5C, 4-(decyloxy)benzoic acid exhibits a melting point of 143° C. and a transition to the isotropic phase at 117 to 143° C. Examples of nematic liquid crystal materials suitable for use as alignment additives include 4,4'-azoxyanisole, 4-isothiocyanatophenyl-4-pentylbicyclo[2.2.2]octane-1-carboxylate, and 4-methoxycinnamic acid. Having the structure shown in FIG. 5D, 4,4'-azoxyanisole exhibits a melting point of 117 to 119° C. and a transition to the isotropic phase at 136° C. Having the structure shown in FIG. 5E, 4-isothiocyanatophenyl-4-pentylbicyclo[2.2.2]octane-1-carboxylate exhibits a melting point of 73 to 113.5° C. and a transition to the isotropic phase at 113.5° C. Having the structure shown in FIG. 5F, 4-methoxycinnamic acid exhibits a melting point of 170 to 173° C. and a transition to the isotropic phase at 190° C.

In some examples in which the alignment additive comprises a liquid-crystal material, the liquid-crystal material, is selected such that it undergoes a phase transition between an aligned (e.g., smectic or nematic) phase and an isotropic phase at or below the melting temperature $T_m$ of the polymer matrix into which the alignment additive is incorporated. Such liquid crystal materials can be dispersed in the isotropic phase at elevated processing temperatures and transition to an aligned phase prior to solidification of the thermoplastic-polymer material, and can help to align the polymer chains via this transition.

Table 2 presents melt-flow data collected on thermoplastic feedstock materials having different concentrations of 4-(heptyloxy)benzoic acid as a liquid-crystal alignment additive.

TABLE 2

Melt-flow data for thermoplastic feedstock materials observed at 5° C. above $T_m$.

| polymer matrix | liquid-crystal % concentration by mass | melt-flow index (g/10 min) |
|---|---|---|
| PEEK | 0 | 2.80 |
| PEEK | 5 | 4.43 |
| PEEK | 7.5 | 6.76 |
| PEEK | 10 | 10.21 |
| Nylon-12 | 0 | 5.12 |
| Nylon-12 | 5 | 40.2 |
| Nylon-12 | 5 | 57.4 |

The data in Table 2 demonstrate significant increase in flowability with increasing concentration of the alignment additive, both for PEEK and Nylon-12 polymers. Table 3 presents additional data on the PEEK feedstock material.

TABLE 3

Differential scanning calorimetry (DSC) and thermogravimetric analysis (TGA) on PEEK feedstock material.

| | | DSC | | TGA | |
|---|---|---|---|---|---|
| matrix | % LC | $T_m$/° C. | $T_g$/° C. | IDT (5 wt % loss)/° C. | % char at 800° C. |
| PEEK | 0 | 342.96 | 248.48 | 559.40 | 49.54 |
| PEEK | 5 | 341.68 | 247.35 | 546.29 | 48.95 |
| PEEK | 7.5 | 341.88 | 245.54 | 533.28 | 53.46 |

More specifically, the data in Table 3 show that the thermal resistance of PEEK is substantially unchanged upon addition of the alignment additive, even at 7.5%.

It will be understood that other suitable high-aspect ratio species can be incorporated into a thermoplastic-polymer matrix as an alignment additive to promote alignment of the polymer chains therein. In other examples, the alignment additive comprises a nanotube or nanowire material comprising numerous nanotubes or nanowires, respectively. More particular examples include carbon nanotubes and silver nanowires, although nanotubes and nanowires comprising other elements are also envisaged.

Figure 6:
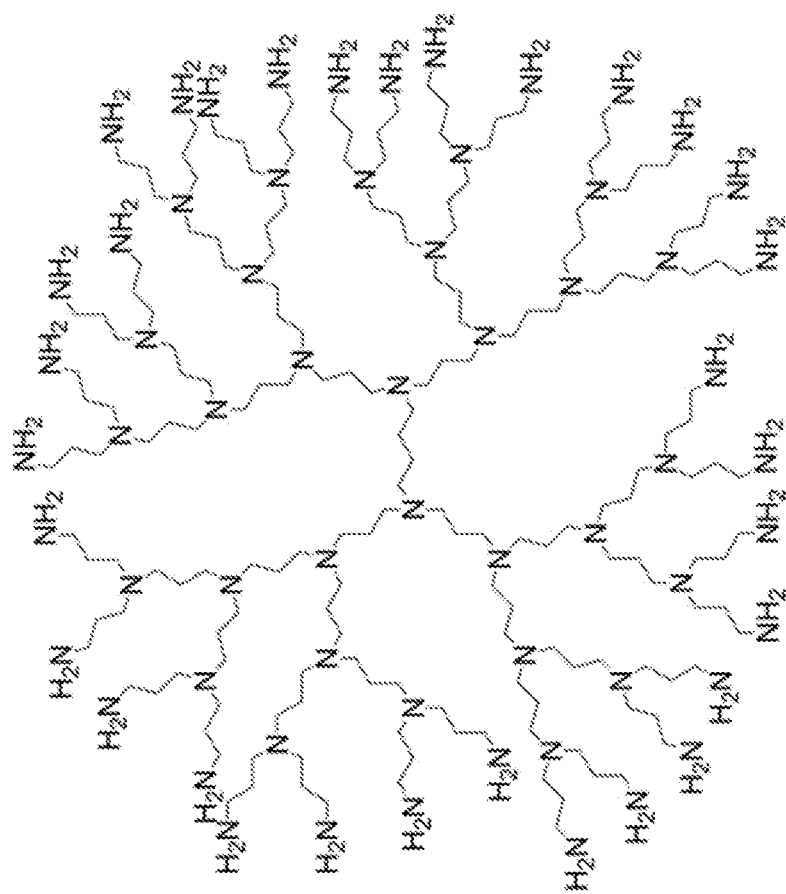
FIG. 6 shows a molecular structure of an example dendrimer usable as an alignment additive in the method of FIG. 4.

Further, in some examples, the alignment additive comprises a plurality of hyperbranched macromolecules, such as a dendrimers. Example dendrimers include poly(amidoamine) (PAMAM) and poly(propylene imine) (PPI). The macromolecular structure of a PPI dendrimer is shown in FIG. 6. As shown in Table 4, PPI dendrimers may be nanosized, with a diameter that varies smoothly with generation number.

TABLE 4

Molecular weight and diameter of a PPI dendrimer versus generation number.

| generation | Molecular weight | diameter/Å |
|---|---|---|
| 0 | 517 | 15 |
| 1 | 1,430 | 22 |
| 2 | 3,256 | 29 |
| 3 | 6,909 | 36 |
| 4 | 14,215 | 45 |
| 5 | 28,826 | 54 |
| 6 | 58,048 | 67 |
| 7 | 116,493 | 81 |
| 8 | 233,383 | 97 |
| 9 | 467,162 | 114 |
| 10 | 934,720 | 135 |

Due to its steric morphology, a dendrimer typically exhibits low intrinsic viscosity and depresses the viscosity of the polymer matrix into which it is dissolved. Furthermore, the intermolecular interactions between a dendrimer and a high molecular-weight thermoplastic matrix may be tuned by controlling the surface functionality of the dendrimer.

In some examples, the thermoplastic-polymer material conveyed at 438 is a composite material, such as a fiber-composite material. More particularly, the thermoplastic-polymer material, in some examples, further comprises a reinforcing additive or filler, such as a fiber additive. Glass fibers and carbon fibers are among the fiber additives envisaged herein.

Continuing now in FIG. 4, at 450 of process 400, at least a portion of the polymeric chains of the thermoplastic-polymer material are spontaneously aligned along a direction of flow through the heated nozzle, via the influence of the alignment additive.

In examples in which alignment additive includes a molecular or macromolecular species having a high aspect ratio, such as a liquid-crystal molecule, nanotube, and/or nanowire, the alignment additive may align naturally in the flow direction of the polymer under fluid-dynamic forces within and fluidically upstream of the heated nozzle. When aligned in this manner, the alignment additive may induce alignment of neighboring polymeric chains via intermolecular forces, such as the van der Waals force, molecular dipole force, hydrogen bonding, etc. In examples in which the alignment additive includes a relatively low molecular-weight, hyperbranched macromolecule, such as a dendrimer, the alignment additive may reduce the viscosity of a flowing high molecular-weight polymer and thereby accelerate the alignment of the polymeric chains due to shear forces within and fluidically upstream of the heated nozzle.

At 452 of process 400, the flowing mass of the thermoplastic-polymer material is released from the heated nozzle at the intended locus position of the article being formed—e.g., on the substrate of the article. At 454, the thermoplastic-polymer material is allowed to solidify at the locus.

At 456 subsequent layers of the thermoplastic-polymer material are added to the layer of the thermoplastic-polymer material already formed. This step can be repeated any number of times, based on the article topology as defined in the digital model, until the desired article has been built up.

At 458 the article is removed from the additive-manufacture apparatus and optionally annealed under controlled-temperature conditions for an appropriate period of time. Annealing may serve to reduce the density of defect sites in the additively manufactured article and thereby increase the strength of the article.

Returning now to FIG. 3A, apparatus 300 can be adapted to the process of additive manufacture from a thermoplastic-polymer feedstock comprising a polymer matrix and an alignment additive as described herein. More particularly, apparatus 300, in some examples, includes an elongate conduit 360 coupled to nozzle 326, fluidically upstream of the nozzle. The elongate conduit may be one to four inches long, for instance. In other examples, the elongate conduit may be up to thirty inches long. Elongate conduits of other length ranges are also envisaged. More generally, the elongate conduit may be of sufficient length to promote at least partial alignment of the polymeric chains of the thermoplastic-polymer material, via the influence of the alignment additive, when the thermoplastic-polymer material flows through the elongate conduit at the elevated temperature. In this adaptation, the cross-sectional dimensions of the elongate conduit may correspond to the cross-sectional dimensions of the feedstock material, and the extrusion rate can be unchanged relative to the rate of extrusion of the unmodified feedstock. Nevertheless, faster and slower rates of extrusion are also envisaged. The setpoint temperature of the elongate conduit is greater than the melting temperature of the thermoplastic-polymer material.

In these and other examples, material conveyor 324 is configured to convey the thermoplastic-polymer material through the elongate conduit and through the nozzle. The apparatus as illustrated also includes a conduit heater 362 coupled thermally to elongate conduit 360 and configured to heat the elongate conduit to an elevated temperature. Taken together, conduit heater 362 and nozzle heater 338 are configured to heat the elongate conduit 360 and nozzle 326 to allow the material to flow within the conduit and through the nozzle. Elongate conduit 360 is of sufficient length to promote at least partial alignment of the polymeric chains of the thermoplastic-polymer material, via the influence of the alignment additive, when the thermoplastic-polymer material flows through the elongate conduit at the elevated temperature. In some examples, conduit heater 362 and nozzle heater 338 can be separate heating units, as illustrated. In other examples, the conduit heater and nozzle heater may be integrated into a single heating unit capable of providing a desired temperature of nozzle 326 and a desired temperature of elongate conduit 360, even if those temperatures are different.

Figure 7:
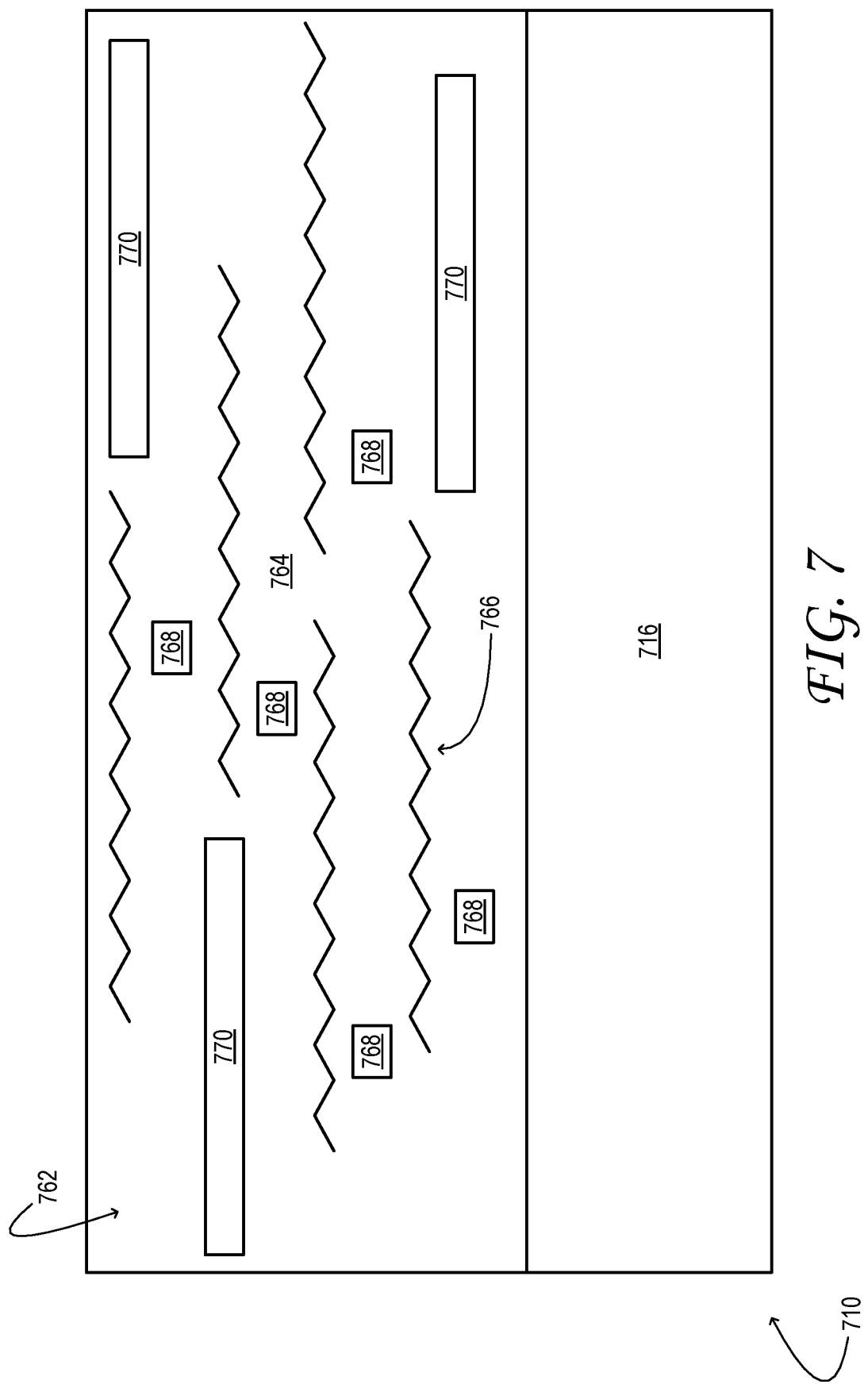
FIG. 7 shows aspects of an example polymer article that may be formed according to the method of FIG. 4.

FIG. 7 shows aspects of an example additively manufactured article 710 that can be formed according to process 400 of FIG. 4. In the illustrated example, article 710 includes a substrate 716 in addition to thermoplastic-polymer material 762, which is added to the substrate via additive manufacture. In some examples, the article can be formed without a substrate and may comprise only the thermoplastic-polymer material. In either case, thermoplastic-polymer material 762 comprises a polymer matrix 764 including a plurality of aligned polymeric chains 766. The polymer matrix can include PEEK or PEKK, but other polymers are also envisaged.

It will be understood that the illustration in FIG. 7 is highly schematic. In real-world examples, the plurality of polymeric chains 766 need not be perfectly aligned, but may be partially aligned. In other words, alignment may be observed between a portion of one polymeric chain and a portion of another polymeric chain. The alignment may involve many such chains and may extend over relatively long distances in polymer matrix 764. In some examples, the degree of alignment of the polymeric chains in article 710 can be assessed via x-ray diffractometry and/or other methods that differentiate between isotropic and ordered molecular configurations, as understood in the art of condensed-phase chemistry. For instance, a matrix of aligned polymeric chains may give rise to relatively sharp peaks in an x-ray diffraction spectrum, whereas an isotropic matrix of identical composition may give rise to a more featureless x-ray diffraction spectrum.

The thermoplastic-polymer material also includes an alignment additive 768 dispersed within polymer matrix 764. In some examples, the alignment additive comprises between 0.1 and 25% by mass of thermoplastic-polymer material 762, or between 0.01 and 10% by mass of thermoplastic-polymer material in more particular examples. In some examples, the alignment additive includes one or more of a liquid-crystal molecule, nanotube, and nanowire. In some of the examples in which alignment additive 768 includes a plurality of liquid-crystal molecules, the liquid-crystal molecules and at least some of the polymeric chains may be aligned substantially in parallel. This feature also can be assessed using x-ray diffractometry and other suitable analytical methods. Alternatively, or in addition, alignment additive 768 can include a hyperbranched macromolecule, as noted above. In the example shown in FIG. 7, thermoplastic-polymer material 762 also includes a strengthening filler in the form of a fiber additive 770. In other examples, the fiber additive may be omitted. When included, the fiber additive can include glass and/or carbon fibers, for instance.

Table 5 presents test data collected on an article that was additively manufactured according to the process of FIG. 4.

TABLE 5

Tensile strength of a PEEK article as a function of the percentage of a liquid-crystal alignment additive.

| matrix | % LC | tensile strength/MPa |
|--------|------|----------------------|
| PEEK   | 0    | 78.19                |
| PEEK   | 5    | 65.77                |
| PEEK   | 7.5  | 70.25                |
| PEEK   | 10   | 64.56                |

The data in Table 5 were acquired in accordance with American Society for Testing and Materials (ASTM) standard protocol ASTM D638 (Standard Test Method for Tensile Properties of Plastics), using a constant-rate-of-crosshead-movement type testing machine. The data reveal that the tensile strength of the PEEK matrix is degraded only marginally even at significant concentrations of the alignment additive. These data can be examined in view of the data from Table 2, which show a 2.4-fold improvement in the flowability of the PEEK feedstock with 7.5% of the alignment additive.

No aspect of the foregoing drawings or description should be construed in a limiting sense, because numerous variations, extensions, and omissions are also envisaged.

For instance, in implementations in which the feedstock material takes the form of a filament, that filament may be pre-processed in order to provide still greater flowability when used in an additive-manufacture apparatus. In the process of forming such a filament, thermoplastic-polymer material 762 with alignment additive 768, in any suitable physical form, is conducted through a heated elongate conduit and nozzle analogous to elongate conduit 360 and nozzle 326 of additive-manufacture apparatus 300. In flowing through the elongate conduit and nozzle, the alignment additive may cause the polymeric chains of the polymer matrix to align in the direction of flow through the nozzle. When the feedstock material emerges from the nozzle and subsequently cools, the alignment of the polymeric chains in the length direction of the cooled filament is locked in. The extruded filament pre-processed in this manner is now usable as a feedstock in the additive-manufacture apparatus.

In some examples, the alignment of the polymeric chains in the above feedstock may be further increased by mechanically drawing the partially solidified feedstock material downstream of the nozzle. The extruded, drawn filament pre-processed in this manner may also be used as a feedstock in the additive-manufacture apparatus. In some scenarios, filaments as described above may even be used in additive-manufacture apparatuses not specifically adapted with elongate conduit 360, as the increased flowability is already provided by virtue of the pre-processing.

It will be understood that the configurations and/or approaches described herein are exemplary in nature, and that these specific embodiments or examples are not to be considered in a limiting sense, because numerous variations are possible. The specific routines or processes described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An additively manufactured article comprising:
   a polymer matrix including a plurality of aligned polymeric chains; and
   an alignment additive dispersed within the polymer matrix and including one or more of a hyperbranched macromolecule, a nanotube, or a nanowire;
   wherein the additively manufactured article comprises a greater melt-flow index than the polymer matrix absent the alignment additive.

2. The additively manufactured article of claim 1, wherein the polymer matrix comprises polyether ether ketone.

3. The additively manufactured article of claim 1, wherein the alignment additive comprises between 0.01 and 25% by mass of the additively manufactured article.

4. The additively manufactured article of claim 1, wherein the polymer matrix comprises a thermoplastic polymer.

5. The additively manufactured article of claim 1, further comprising a reinforcing additive.

6. The additively manufactured article of claim 5, wherein the reinforcing additive comprises a fiber additive.

7. The additively manufactured article of claim 1, wherein the additively manufactured article is a part for an aircraft.

8. The additively manufactured article of claim 7, wherein the part is a part for a cabin interior of the aircraft, a part for a power plant of the aircraft, a part for a skin of the aircraft, or a part for an aerostrucure of the aircraft.

9. The additively manufactured article of claim 7, wherein the polymer matrix comprises a nylon compound.

10. The additively manufactured article of claim 1, wherein the polymer matrix comprises polyether ketone ketone.

11. A material adapted as a feedstock for additive manufacture, the material comprising:
    a polymer matrix including a plurality of polymeric chains, the polymer matrix configured to form a flowable mass at an elevated temperature; and an alignment additive dispersible within the polymer matrix, the alignment additive comprising one or more of a hyperbranched macromolecule, a nanotube, or a nanowire, and the alignment additive being configured to align the plurality of polymeric chains in a direction of flow through a conduit of an additive-manufacture apparatus;

wherein the material comprises a greater melt-flow index than the polymer matrix absent the alignment additive.

12. The material of claim 11, wherein the polymer matrix comprises polyether ether ketone.

13. The material of claim 11, wherein the alignment additive comprises between 0.01 and 25% by mass of the material.

14. The material of claim 11, further comprising a fiber additive.

15. The material of claim 11, wherein the material comprises one or more of a powder, a pellet, or a filament.

16. The material of claim 11, wherein the material comprises a filament in which the plurality of polymeric chains are aligned in a length direction of the filament.

17. The material of claim 11, wherein the polymer matrix comprises polyether ketone ketone.

18. The material of claim 11, wherein the polymer matrix comprises a nylon compound.

19. The material of claim 11, wherein the polymer matrix comprises two or more thermoplastic polymers.

20. The material of claim 11, further comprising a reinforcing additive.

21. An aircraft comprising:
an additively manufactured article, the additively manufactured article comprising,
a polymer matrix including a plurality of aligned polymeric chains; and
an alignment additive dispersed within the polymer matrix and including one or more of a hyperbranched macromolecule, a nanotube, or a nanowire;
wherein the additively manufactured article comprises a greater melt-flow index than the polymer matrix absent the alignment additive.

22. The aircraft of claim 21, wherein the additively manufactured article comprises a part for a cabin interior of the aircraft, a part for a power plant of the aircraft, a part for a skin of the aircraft, or a part for an aerostructure of the aircraft.

23. The aircraft of claim 21, wherein the polymer matrix comprises a thermoplastic polymer.

24. The aircraft of claim 21, wherein the alignment additive comprises between 0.01 and 25% by mass of the additively manufactured article.

* * * * *